United States Patent [19]
Lösing

[11] Patent Number: 5,078,875
[45] Date of Patent: Jan. 7, 1992

[54] DEVICE FOR REMOVING SOLID PARTICLES AND LIQUIDS OF HIGHER DENSITY FROM A LIQUID OF LOWER DENSITY

[76] Inventor: Willibrord Lösing, Essener Strasse 108, 4320 Hattingen 16, Fed. Rep. of Germany

[21] Appl. No.: 578,832

[22] Filed: Sep. 6, 1990

[30] Foreign Application Priority Data

Sep. 6, 1989 [EP] European Pat. Off. ........ 89116446.9

[51] Int. Cl.[5] ............................................. B01D 24/00
[52] U.S. Cl. .................................... 210/295; 210/304; 210/440; 210/512.1
[58] Field of Search .................. 210/512.1, 512.3, 343, 210/294, 304, 313, 306, 312, 311, 86, 94, 295, 440, 456, 778, 444, 787; 55/159

[56] References Cited

U.S. PATENT DOCUMENTS

| | | | |
|---|---|---|---|
| 4,298,465 | 11/1981 | Druffel | 210/512.1 |
| 4,312,751 | 6/1982 | Casamitjana | 210/94 |
| 4,456,529 | 6/1984 | Shinaver | 210/313 |
| 4,502,954 | 3/1985 | Druffel | 210/311 |
| 4,508,621 | 4/1985 | Jackson | 210/86 |

FOREIGN PATENT DOCUMENTS

| | | |
|---|---|---|
| 1544111 | 7/1966 | Fed. Rep. of Germany . |
| 2436080 | 2/1979 | Fed. Rep. of Germany . |
| 882714 | 6/1943 | France . |

Primary Examiner—Robert A. Dawson
Assistant Examiner—Ana M. Fortuna
Attorney, Agent, or Firm—Herbert Dubno

[57] ABSTRACT

The separator for removing dirt and water from a liquid fuel has a rectangular cross section central portion of its housing provided with a filter and a cup shaped lower portion of the housing having a guide tube through which the liquid is introduced downwardly around a helical body generating a vortex flow of the liquid before it is diverted downwardly around the guide tube into the filter. The exterior of the guide tube is formed with a pair of horizontal V-shaped feedback passages which draw droplets of the liquid of higher density downwardly to meet the flow from the interior of the guide tube before it is deflected upwardly, thereby increasing the separation efficiency.

12 Claims, 3 Drawing Sheets

DEVICE FOR REMOVING SOLID PARTICLES AND LIQUIDS OF HIGHER DENSITY FROM A LIQUID OF LOWER DENSITY

FIELD OF THE INVENTION

My present invention relates to a device or apparatus for the separation of solid particles and a fluid of higher density from a fluid of lower density. More particularly, the invention relates to the removal of solid particles and liquid of higher density from a liquid of lower density, particularly solid particles and water from liquid fuel such as gasoline, diesel fuel or heating oil.

BACKGROUND OF THE INVENTION

It is known from German Patent Document DE-AS 2,436,080, for example, to provide a separator for solid particles and water in a fuel line which has a housing in an upper end of which a filter is provided and at a lower end of which a cup for collecting the heavier fluid is disposed. In this system, means is provided for imparting a twist to the liquid as it is deflected to cause separation of the heavier material from the liquid based upon momentum and kinetic energy.

In this arrangement, inverted conical elements insure practically two 180° changes in direction before the liquid traverses horizontally a filter unit in which dirt particles are collected.

Experience has shown that this earlier device is only limitedly effective for the removal of liquid of higher density from a liquid of lower density. I have found that this effect is due in part because the liquids of higher density are not always located or collected effectively at the lowest point in the housing.

OBJECTS OF THE INVENTION

It is, therefore, the principal object of my present invention to provide a device for the purposes described which has an improved degree of separation, i.e. an improved ability to separate solid particles and heavier liquids from liquids of lower density.

Another object of this invention is to provide an apparatus for the purposes described in which the collections of heavier liquid from a lighter liquid is more efficient.

Still another object of the invention is to provide a device for the purposes described which avoids drawbacks of earlier systems.

SUMMARY OF THE INVENTION

These objects and others which will become apparent hereinafter are attained, in accordance with the present invention, in a separator for the separation of a heavier fluid from a lighter fluid and the removal of solid particles therefrom, especially dirt particles and water from gas, diesel fuel or heating oil, which comprises a housing having an inlet passage and an outlet passage disposed above and below a central part, a cover for the central part and a deflector separator provided in a lower part of the housing in a flow path between the inlet and the outlet.

According to the invention, the inlet passage is connected to a guide tube which extends along an axis of the longitudinal chamber provided by the housing over part of the height thereof to terminate above the lower portion of the cup and generates with a tubular body within this tube a downward vortex flow of liquid emerging from liquid outlets before the liquid is deflected through 180° to pass upwardly through that body around the tube, the filter and the outlet.

According to the invention, on this guide tube, a pair of outer horizontally turned V-shaped separator feedback passages are provided between angled ribs which reach to the wall of the cup defining the lower portion of the tube.

The invention is based upon the discovery that the droplets of liquid which are to be separated out and have a higher density than the liquid passed through the apparatus tend to remain in large number above the liquid outlets from the guide tube and thus never pass downwardly into the lower portion of the cup in prior constructions. On the contrary, these droplets appear to be reentrained with the liquid of lower density.

To overcome this effect, the invention provides, in the form of the V-shaped feedback passages, a means, constituted by the ribs, which prevents upwardly flowing liquid from passing around the guide tube in such form that the heavier liquid particles can be reentrained, and which ensures that the heavier liquid will be directed downwardly toward the body of the housing.

Practical tests have shown that for an apparatus of a given size, using the recycle or feedback passages and the ribs on the exterior of the guide tube, it is possible to achieve twice the separation efficiency.

According to a feature of the invention, the lower V shank of each feedback passage has a component extending in the direction of the vortex flow passage. In this manner it is possible to create a kind of water pump which generates suction at the feedback passage and thus greatly amplifies the effect of drawing the liquid of higher density downwardly from the regions between the guide tube and the housing wall.

By providing the feedback passages so that they widen in a funnel shaped manner at their upper ends and/or forming the feedback passages so that they decrease uniformly in width from upper to lower end, I can also effect a substantial improvement in the downward movement of any liquid of higher density which may tend to collect on the walls of the housing or the guide tube.

To maintain the vortex flow with longer guide tubes, it is advantageous to form the guide tube between the inlet passage and the feedback passages with outer helical rib segments.

From a fabrication point of view it has been found to be advantageous to form the inlet passages by a transverse tube transversing the central part and which is closed or closable at one end and to connect it via roof liking inclines with the guide tube. In this manner the central part, the transverse tube and the guide tube can be formed in one piece. It also allows connection of the incoming liquid on one side on the opposite side or on two diametrically opposite sides of the apparatus.

It has also been found to be advantageous to form the central part in the region of or at the level of the inlet passage with an inwardly open circumferential horizontal, groove, channel or outward bulge to aid in coalescence. This groove which can be partially circular to partially elliptical in cross section allows the liquid droplets of higher density to find a region of low flow velocity in which they can coalesce with other droplets of the higher density liquid and then pass downwardly to the separator feedback passages.

According to another feature of the invention, the outlet is provided above the filter unit on the central portion of the housing. The filter is thus traversed upwardly by the liquid and suspended liquid droplets of high density can fall into the lower part without difficulty.

In addition, the dirt particles can be permitted to pass downwardly with draining liquid into the lower part when a vent screw in the upper part and a cock in the lower part are opened.

Other means can be provided for counterflow flushing of the filter if desired.

With the system of the invention, the number of 180° diversions of the liquid is significantly reduced so that there is a marked reduction in the flow resistance in the system of the invention without loss of separation efficiency.

From a fabrication point of view, in addition, the housing can be provided so that in the lower portion it is circularly cylindrical and in the central portion is selectively rectangular and preferably square in cross section. The circularly cylindrical shape in the lower portion is advantageous with respect to the flow conditions while the rectangular cross section of the central portion allows the filter unit to be of especially simple construction because that unit must be changed from time to time.

BRIEF DESCRIPTION OF THE DRAWING

The above and other objects, features and advantages of my invention will become more readily apparent from the following description, reference being made to the accompanying highly diagrammatic drawing in which.

SPECIFIC DESCRIPTION

Figure 1:
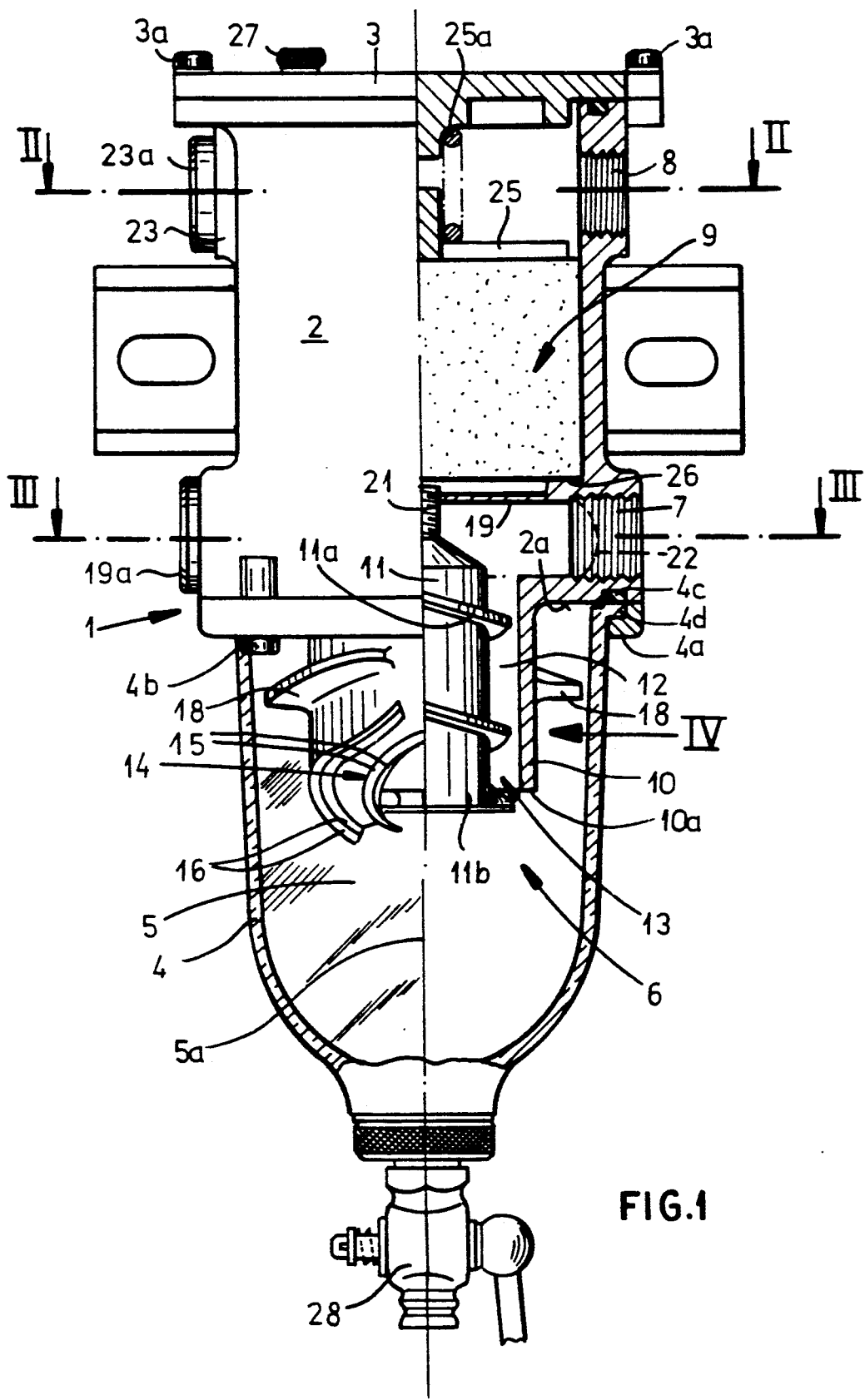
FIG. 1 is a partial longitudinal section through a device according to the invention or separating particles and liquids or lower density from a liquid of higher density.

The device shown in the drawing serves to separate solid particles or a liquid of higher density from a liquid of lower density especially solid contact particles and water from liquid fuels such as gasoline, diesel fuel or heating oil.

The device basically comprises a housing 1 having a central portion 2, a cover 3 attached to the central portion 2 by bolts 3a, and a cup-shaped lower portion 4 secured to the central portion 2 by a ring 4a and bolts 4b transversing the ring. A seal 4c may be provided between a rim 4d of the cup 4 and an annular shoulder 2a of the central portion. The cup forms an elongated chamber 5 with an upright axis 5a.

In the cup-shaped lower portion, a deflection-type separator 6 is provided while in the central portion 2 which is formed with an inlet passage 7 and an outlet 8, a filter unit 9 is provided above the inlet passage 7.

The deflection separator 6 is comprised of the lower end axially extending guide tube 10 communicating with the inlet passage 7. This guide tube 10 extends along the chamber axis and is shaped inwardly from the wall of the cup 4 to define with a body 11 having a helical rib 11a, a vortex flow passage 12 with a downwardly discharging liquid outlet opening 13. The body 11 can have an outwardly conically divergent end 11b lying below the outlet end 10a of the guide tube 10 to deflect the outward flow of liquid outwardly.

Figure 4:
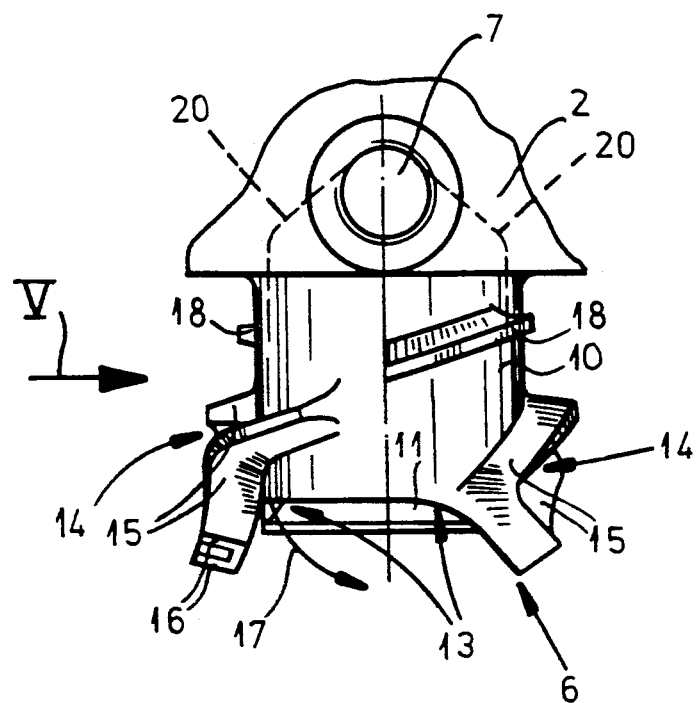
FIG. 4 is a side elevational view of the portion indicated by the arrow 4 of FIG. 1.
Figure 5:
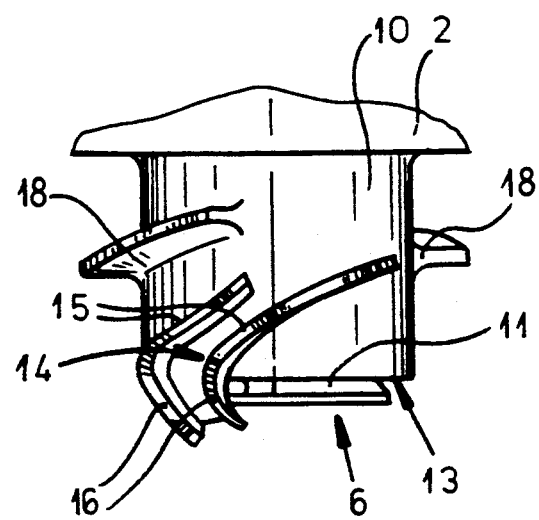
FIG. 5 is a detailed view similar to FIG. 4 but seen in the direction of arrow V and thus seen at a right angle to the view IV of FIG. 1.

As can be seen from FIGS. 1, 4 and 5, two such outlet openings 13 are provided in diametrically opposite relationships. From the same FIGURE it will be apparent that the guide tube 10 is formed at its lower end between these outlet openings 13 with respective pairs of outwardly disposed ribs 15 defining between them horizontally oriented or recumbent V-shaped separator feedback passages 14. Thus a respective feedback passage 14 is formed on each of two diametrically opposite sides of the guide tube 10 between the respective outlets 13 and is defined between a respective pair of angled ribs 15 extending substantially to the wall of the cup 4. The respective lower V shank 16 of the separator feedback passage 14 has a component extending in the direction of the vortex passage 12.

The arrow 17 (FIG. 4) indicates clearly that the partial stream of liquid emerging from each of the outlet 13 generates a suction effect in the respective separator feedback passage 14. FIG. 4 also indicates that the separator feedback passages 14 at their upper ends widens in a funnel like manner to provide a more or less continuously decreasing width in the downward direction.

FIG. 4 also indicates that the guide tube 10 between the inlet passage 7 and the feedback passage 14 has outer helical rib segments 18 which also reach substantially to the inner wall of the cup 4.

Figure 2:
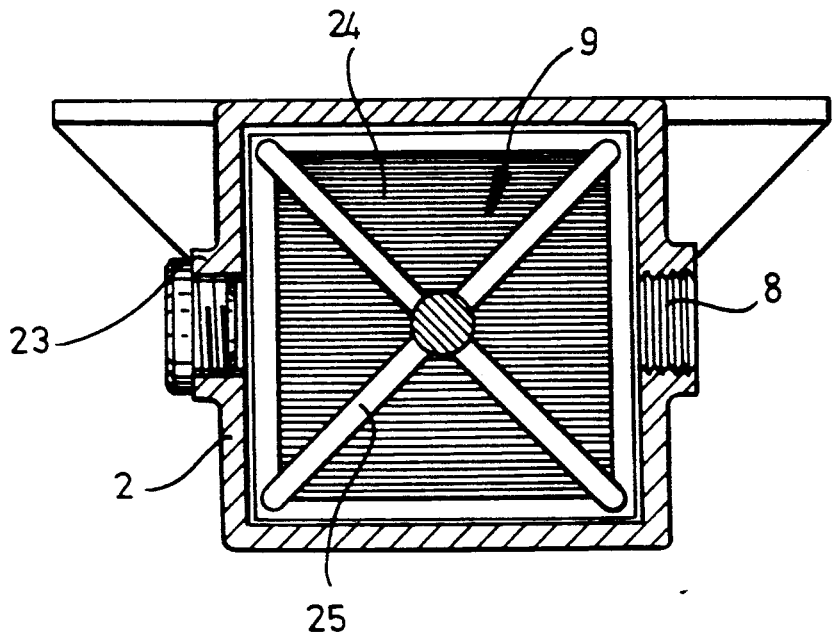
FIG. 2 is a section taken along the lines II—II of FIG. 1.
Figure 3:
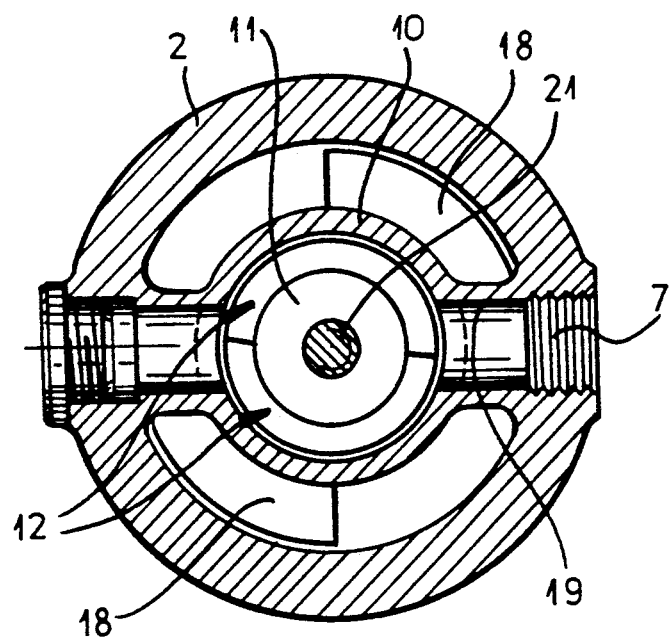
FIG. 3 is a cross sectional view taken along the lines III—III of FIG. 1.

The inlet passage 7 is formed by a transverse tube 19 traversing the central part 2 (see FIGS. 1 and 2). This transverse tube 19 is closed by a plug 19a at one end which can be removed if desired so that the inlet fitting 7 can be provided at different sides of the apparatus by shifting the plug 19a.

The transverse tube 19 is connected by rooflike inclined portions 20 with the guide tube 10.

The central part 2 with the transverse tube 10 can be formed by a single cast piece, e.g. by diecasting. A threaded formation 21 on the inner tubular body 11 can traverse the tube 19 between the rooflike inclines 20 to hold the body 11 in the guide tube 10.

From FIG. 1 it also will be apparent that the central part 2 in the region of or at the level of the inlet passage 7 has a horizontal encircling inner bulge 22 of partial circular cross section to partially elliptical cross section to assist in coalescence.

The outlet 8 is provided above the filter unit 9 on the central part 2 and is preferably disposed directly beneath the cover 3. As with the inlet passage 7, a fitting 23 can be provided at the distinctive opposite side of the housing and closed at a plug 23a to allow the outlet to be located at either side.

The housing 1 or the longitudinal chamber 5 has, in the region of its lower portion 4, a circularly cylindrical configuration. The cup 4 itself can be composed of a transparent material, for example, a polycarbonate. If, however, the pressures are such that a polycarbonate cannot be used, the cup and the remainder of the device can be fabricated from aluminum.

From the region at the central part 2, the housing 1 and the longitudinal chamber 5 have a substantially rectangular, preferably a square cross section.

This allows the filter element to have an especially simple configuration.

The folds 24 of the filter unit 9 constituted of folded paper can then at the upper and lower sides of the filter unit run parallel to or perpendicular to the sides of the central portion 2 of the housing. Otherwise the construction of the filter unit 9 can be conventional.

The filter unit 9 is pressed by a star-shaped element 25 and a spring 25a against a corresponding seat 26 designed to prevent the liquid passing from the cup 4 to the outlet 8 from bypassing the filter unit 9.

The cover 3 is provided with a venting screw while the lower part of the cup 4 has a discharge cock 28 fitted thereto.

The function of the apparatus of the invention can be ascertained without difficulty from the FIGURES of the drawing.

The liquid fed through the inlet passage 7 flows between the guide tube 10 and the helical body 11 such that it is distributed by the helical movement imparted thereto by the ribs 11a.

After leaving through the outlet openings 13 the liquid is diverted through 180° upwardly along the exterior of tube 10 so that liquid droplets of higher density tend to sink along with any particles which may have been entrained in the liquid.

Above the liquid outlet openings 13, any droplets of higher density on the walls tend to coalesce and are trained best through feedback passages 14 downwardly into the lower cup portion 4, this feedback being promoted by the suction effect of the liquid emerging from the openings 13.

The coalescence occurs also in the region of the inner recess or outward bulge 22 and other surfaces of the lower portion 4 of the housing below the filter unit 9.

The liquid, freed from the heavier droplets and particles, passes upwardly through the cup around the tube 10 into and through the filter unit 9 which recovers any remaining contaminant or dirt particles and delivers the liquid at relatively low pressure to the outlet 8. After interruption of the liquid supply, the vent screw 17 can be opened and the cock 28 opened to discharge retained dirt particles on the filter unit and liquid of higher density which collects in the lower part of the housing as the liquid level in the unit falls by the draining thereof.

I claim:

1. A device for separating solid particles and liquid of a higher density from a liquid of a lower density in a liquid stream, comprising:
    a housing formed with a central portion and a lower portion below said central portion and defining a longitudinal chamber having an upright filter axis, an inlet passage connected with said central portion, an outlet connected with said central portion and a cover on said central portion, said lower portion being formed by a cup-shaped member;
    a guide tube extending downwardly in said lower portion over a part of the height thereof and communicating with said inlet passage, said guide tube terminating above a bottom of said lower portion;
    a body in said guide tube formed with an external helical rib defining a vortex flow passage with said guide tube and having lower outlet openings;
    a filter unit in said central portion transversed by liquid from said lower portion passing between said guide tube and a wall of said member; and
    horizontally-oriented V-shaped separate feedback passages on the exterior of said guide tube at diametrically opposite ends thereof between said outlet openings, said guide tube being formed with two angled ribs defining each of said feedback passages between them whereby said feedback passages induce a downward movement of liquid of high density.

2. The device defined in claim 1 wherein each lower V shank of said angled ribs has a component extending in the direction of said vortex passage whereby flow through said vortex passage generates suction in said feedback passages.

3. The device defined in claim 1 wherein said feedback passages widen in a funnel shaped manner upwardly at their upper ends.

4. The device defined in claim 1 wherein said feedback passages have a progressively downwardly decreasing width.

5. The device defined in claim 1, further comprising helical rib segments between said inlet passage and said feedback passages on the exterior of said guide tube.

6. The device defined in claim 1 wherein said inlet passage is formed by a transverse tube traversing said central portion and connected with said guide tube by rooflike inclines.

7. The device defined in claim 1 wherein said central portion is formed at the level of said inlet passage with a horizontal peripherally extending inwardly open groove assisting in coalescence of droplets of said liquid of said higher density.

8. The device defined in claim 7 wherein said groove is a partial circular cross section.

9. The device defined in claim 7 wherein said groove has a partial elliptical cross section.

10. The device defined in claim 1 wherein said outlet is provided above said filter unit on said central portion.

11. The device defined in claim 1 wherein said housing is substantially of rectangular cross section in the region of said central portion and has a circular cylindrical configuration in the region of said lower portion.

12. The device defined in claim 11 wherein said rectangular cross section is a square cross section.

* * * * *